(12) United States Patent
Gupta et al.

(10) Patent No.: US 11,373,490 B2
(45) Date of Patent: Jun. 28, 2022

(54) TEMPERATURE INDICATOR FOR OPTICAL MODULE

(71) Applicant: CISCO TECHNOLOGY, INC., San Jose, CA (US)

(72) Inventors: Rohit Dev Gupta, Bangalore (IN); Joel Richard Goergen, Soulsbyville, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 26 days.

(21) Appl. No.: 16/919,832

(22) Filed: Jul. 2, 2020

(65) Prior Publication Data

US 2022/0005328 A1    Jan. 6, 2022

(51) Int. Cl.
*G08B 5/36* (2006.01)
*G01K 11/14* (2006.01)
*H04B 10/25* (2013.01)

(52) U.S. Cl.
CPC ........... *G08B 5/36* (2013.01); *G01K 11/14* (2013.01); *H04B 10/25* (2013.01)

(58) Field of Classification Search
CPC ........... G08B 5/36; G01K 11/14; H04B 10/25
See application file for complete search history.

(56) References Cited

U.S. PATENT DOCUMENTS

| | | | |
|---|---|---|---|
| 6,727,820 B2* | 4/2004 | Pedoeem | H05K 7/20581 340/584 |
| 6,788,197 B1* | 9/2004 | Thuillard | G08B 29/186 340/522 |
| 7,510,334 B2 | 3/2009 | Holmquist | |
| 9,182,561 B2 | 11/2015 | Bauco | |
| 10,113,920 B2 | 10/2018 | Edson | |
| 10,459,180 B2 | 10/2019 | Yang | |
| 10,690,868 B1* | 6/2020 | Goergen | G02B 6/4436 |
| 10,741,953 B1* | 8/2020 | Huang | G02B 6/3897 |
| 10,788,637 B2* | 9/2020 | Ikonomov | G02B 6/4269 |
| 11,016,252 B2* | 5/2021 | Curtis | H05K 7/20418 |
| 2002/0180610 A1* | 12/2002 | Pedoeem | H05K 7/207 340/635 |
| 2003/0094469 A1* | 5/2003 | Bolts | A45F 3/20 224/148.5 |
| 2005/0008350 A1* | 1/2005 | Cardellach Lopez | G01K 11/12 392/388 |
| 2008/0221739 A1* | 9/2008 | Pryor | A47J 43/0766 700/292 |
| 2008/0290648 A1* | 11/2008 | Koops | C09J 7/38 283/81 |
| 2011/0140898 A1* | 6/2011 | Berke | G08B 21/182 340/584 |
| 2012/0051490 A1* | 3/2012 | Hussain | G06K 19/00 377/15 |

(Continued)

*Primary Examiner* — Chico A Foxx (57) ABSTRACT

In one embodiment, an apparatus includes an optical module comprising a first end for insertion into a network device and a second end extending from the network device when the optical module is inserted into the network device, and a temperature indicator thermally coupled to the optical module and extending from said second end of the optical module. The temperature indicator provides an indication that a surface temperature of the optical module exceeds a predefined safe touch temperature limit.

20 Claims, 6 Drawing Sheets

(56) References Cited

U.S. PATENT DOCUMENTS

| | | | | |
|---|---|---|---|---|
| 2012/0052265 | A1* | 3/2012 | Le Bris | G01K 11/12 |
| | | | | 428/207 |
| 2013/0010827 | A1* | 1/2013 | Pimia | C09K 9/00 |
| | | | | 374/E11.018 |
| 2013/0077253 | A1* | 3/2013 | Macall | G02B 6/4261 |
| | | | | 361/715 |
| 2013/0315582 | A1* | 11/2013 | Kawanishi | H04B 10/40 |
| | | | | 398/17 |
| 2014/0321061 | A1* | 10/2014 | Moore | H05K 9/0058 |
| | | | | 361/709 |
| 2015/0118362 | A1* | 4/2015 | Raczynski | A47J 36/00 |
| | | | | 426/87 |
| 2016/0056890 | A1* | 2/2016 | Boldicke | H04B 10/25 |
| | | | | 398/25 |
| 2017/0279523 | A1* | 9/2017 | Parkin | H04B 10/25 |
| 2018/0309519 | A1* | 10/2018 | Yuda | H04B 1/036 |
| 2018/0310363 | A1* | 10/2018 | Varnedoe | B32B 27/08 |
| 2020/0079511 | A1 | 3/2020 | Meis | |
| 2020/0205312 | A1* | 6/2020 | Ikonomov | H05K 7/20336 |
| 2020/0292769 | A1* | 9/2020 | Zbinden | G02B 6/4269 |
| 2020/0386941 | A1* | 12/2020 | Kang | H04B 10/40 |
| 2021/0134446 | A1* | 5/2021 | Rush | A61B 5/0205 |

* cited by examiner

TEMPERATURE INDICATOR FOR OPTICAL MODULE

TECHNICAL FIELD

The present disclosure relates generally to optical modules, and more particularly, to identifying a safe touch surface temperature on the optical module.

BACKGROUND

Over the past several years, there has been a tremendous increase in the need for higher performance communications networks. Increased performance requirements have led to an increase in energy use resulting in greater heat dissipation from components. As power dissipation increases, cooling of components is becoming very difficult. The surface temperature of removable components such as optical modules installed in a network device may reach temperatures that are unsafe for human touch.

BRIEF DESCRIPTION OF THE FIGURES

Corresponding reference characters indicate corresponding parts throughout the several views of the drawings.

DESCRIPTION OF EXAMPLE EMBODIMENTS

Overview

In one embodiment, an apparatus generally comprises an optical module comprising a first end for insertion into a network device and a second end extending from the network device when the optical module is inserted into the network device and a temperature indicator thermally coupled to the optical module and extending from the second end of the optical module. The temperature indicator provides an indication that a surface temperature of the optical module exceeds a predefined safe touch temperature limit.

In another embodiment, an apparatus generally comprises a line card comprising a plurality of optical module ports and a plurality of optical modules inserted into the optical module ports, each of the optical modules comprising a temperature indicator thermally coupled to a housing of the optical module. The temperature indicator provides an indication that a surface temperature of the optical module exceeds a predefined safe touch temperature limit and is viewable with the optical module inserted into the line card.

In yet another embodiment, an apparatus comprises an optical module comprising a first end for electrically coupling the optical module to a network device and a second end comprising an optical connector, and a temperature indicator strip thermally coupled to the optical module and extending from the second end of the optical module. The temperature indicator strip is configured to change between a first color indicating that a surface temperature of the optical module is below a predefined safe touch temperature limit and a second color indicating that the surface temperature of the optical module exceeds the predefined safe touch temperature limit.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

As performance requirements increase, optical modules continue to increase in speed and power. As optical power dissipation increases, cooling of optical components is becoming very difficult. For example, pluggable optical modules (transceivers) have limited heat sink surface availability and use of a riding heatsink is not very effective in terms of heat conduction between surfaces. Due to the high power dissipation and limited cooling, optical modules operate at high temperatures, resulting in hot external metal surfaces. The surface temperature of the optical module may reach temperatures that are unsafe for human touch. Heat conduction within a metal shell of the optical module body may result in the optical module reaching high temperatures, including a portion of the module that is outside of the chassis, which may reach temperatures above 55° C. and even up to 75° C. or higher. A safe touch surface temperature to protect maintenance personnel may be limited to 48° C. for example, however, this limit is often exceeded during operation due to cooling limitations. The problem is further compounded by the optical density on line cards, fabric cards, and route processor/controller cards. Since there is little room to work, a technician may hold onto whatever he can reach to remove the module. In addition to a risk of burn injury, there is also a risk of damage or even possibly fire when a hot module is removed and placed on a surface that is not safe for exposure to high temperatures. Therefore, it is important for the technician to be able to easily identify if the optical module is safe to touch to avoid burn injuries or other damage.

The embodiments described herein provide a temperature indicator integrated into an optical module to indicate when a surface of the optical module exceeds a safe touch temperature (i.e., too hot to safely touch) and when it is safe to touch and remove the module. The temperature indicator allows maintenance personnel to easily identify when an external surface of the optical module is below a safe touch temperature limit so that the user knows when it is safe to remove the optical module without risk of burn injury. The embodiments described herein may provide compliance with any number of safety standards and prevent burn injury due to accidental touch, thereby providing an improved user experience.

It is to be understood that the term "optical module" as used herein refers to any modular optical component (e.g., optical transceiver module) configured for insertion and removal from a modular electronic system (network device), which may include insertion and removal from a line card. The term "line card" as used herein refers to any type of card (e.g., line card, fabric card, service card, route processor card, controller card, or other card) that may be installed in the network device. Also, it is to be understood that the terms front, rear, above, or below as may be used herein are only relative terms and that the network device may have ports for receiving the optical modules located on any face. For example, the term "front face" as used herein refers to an exposed or accessible side of the network device in which ports are located.

Figure 1A:
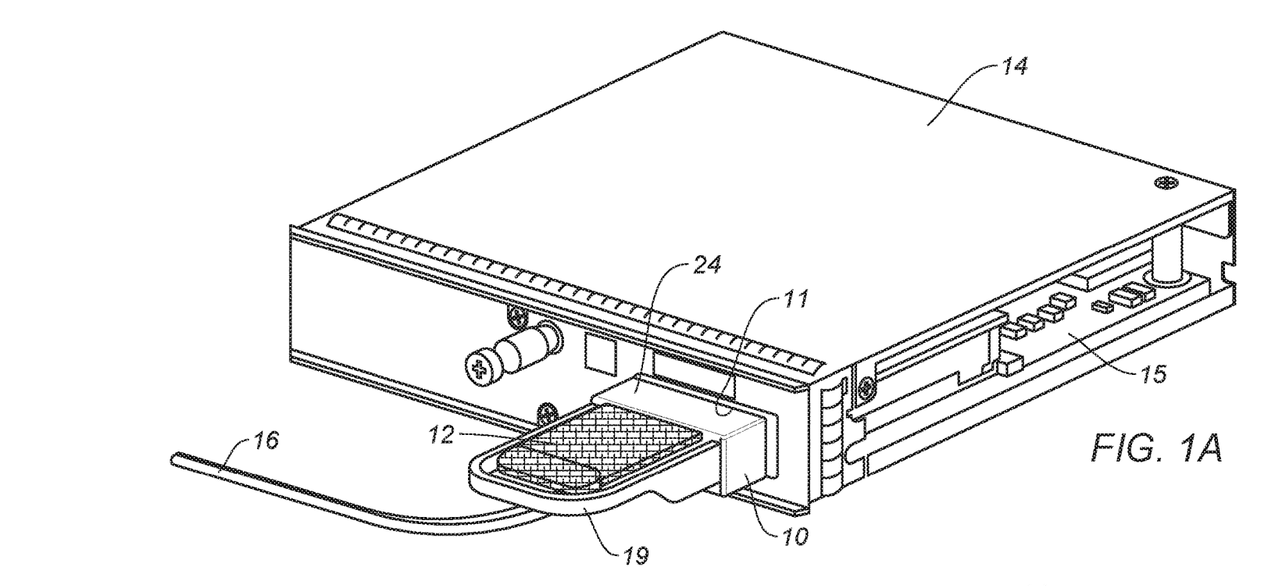
FIG. 1A is a perspective of an optical module with a temperature indicator strip inserted into a line card, in accordance with one embodiment.
Figure 1B:
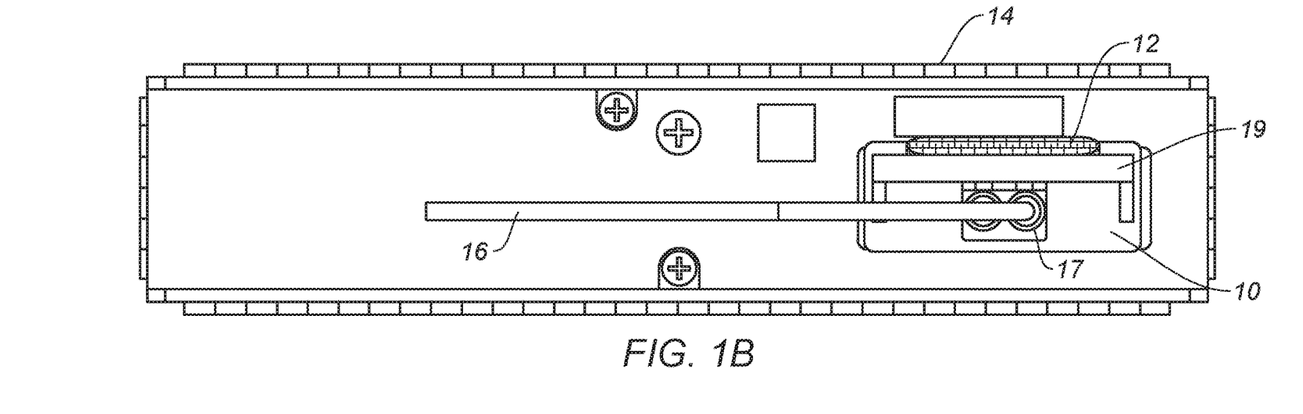
FIG. 1B is a front view of the optical module and line card.

Referring now to the drawings, and first to FIGS. 1A and 1B, a perspective and front view of an optical module 10 with a temperature indicator (temperature indicator strip, temperature indicator tab) 12 is shown in accordance with one embodiment inserted into an optical module port 11 in line card 14. In one or more embodiments, an apparatus comprises the optical module 10 comprising a first end for insertion into the network device (e.g., line card 14 of network device) and a second end extending from the network device when the optical module is inserted into the network device, and the temperature indicator 12 thermally coupled to the optical module (e.g., thermally coupled to a housing of the optical module) and extending from the second end of the optical module. As described in detail below, the temperature indicator 12 is configured to sense a surface temperature of the optical module through thermal conduction between an optical module housing and the temperature indicator and provide an indication that the surface temperature of the optical module exceeds a predefined safe touch temperature limit. The temperature limit may be selected based on module type or environment, or may be based on a standard (e.g., NEBS GR63 touch safe temperature limit of 48° C., UL 60950 touch safe temperature limit of 60° C., or any other standard).

The optical module 10 may be a pluggable transceiver module in any form factor (e.g., SFP (Small Form-Factor Pluggable), QSFP (Quad Small Form-Factor Pluggable), QSFP-DD, CFP (C Form-Factor Pluggable), CFP2, CXP (100G/Common Transceiver Pluggable), and the like) operable within a network device (e.g., line card 14). The optical module 10 may, for example, be plugged into a module based switch, router, or other optical platform port. A cable 16 connected to the optical module 10 at an optical connector 17 (FIG. 1B) may carry, for example, data (e.g., fiber optics, optical array, fabric) or data and power. The optical transceiver module 10 operates as an engine that bidirectionally converts optical signals to electrical signals or in general as an interface to a network element copper wire or optical fiber. A host for the pluggable optical module 10 may include the line card 14 comprising a printed circuit board (PCB) 15 and electronic components and circuits operable to interface telecommunications lines in a telecommunications network. The host may be configured to perform one or more operations and receive any number or type of pluggable transceiver modules 10 configured for transmitting and receiving signals.

In the example shown in FIGS. 1A and 1B, the optical module 10 comprises a pull-release handle (pull tab) 19. While the handle 19 may assist with insertion or removal of the optical module 10, removal of the optical module typically involves grabbing onto an end of a case (housing) 24 of the optical module extending from the line card (FIG. 1A). In the example shown in FIGS. 1A and 1B, the temperature indicator strip 12 is located generally within (or adjacent to) an opening defined by the handle 19 of the optical module 10 and may extend above the handle for easy viewing of the temperature indicator strip. The temperature indicator strip 12 may be customized for different types of modules without any changes to existing handle designs. The temperature indicator strip 12 may be thermally connected (embedded) within (or on) the optical module surface (external surface of housing 24) to provide improved correlation with the optical module surface temperature. The temperature indicator strip 12 extends outward from the second end of the optical module housing 24 so that it is easily visible to indicate if the outer surface of the module is safe to touch or too hot to touch (i.e., exceeds safe human touch operating temperature as suggested by regulatory compliance standards or other specified temperature limit). This helps to prevent burn injury to a technician (operator, maintenance personnel, user) and lets the technician known when it is safe to remove the optical module 10 from the network device during OIR (Online Insertion and Removal).

In one or more embodiments, a change in the optical module surface temperature is identified by a change in color of the temperature indicator 12. For example, as described below, the temperature indicator strip 12 may comprise a thermochromic (also referred to as thermochromatic) pigment (substance, compound) (or other temperature changing material) configured to change from a first color to a second color at the predefined safe touch temperature limit and return to the first color when the surface temperature of the optical module falls below the predefined safe touch temperature limit (reversible color changing properties).

It is to be understood that the line card 14 shown in FIGS. 1A and 1B and the optical module 10 inserted therein is only an example and the line card (e.g., line card, fabric card, route processor card, controller card, and the like) may include any number of ports 11 for receiving any number or type of optical modules in any arrangement.

Figure 2A:
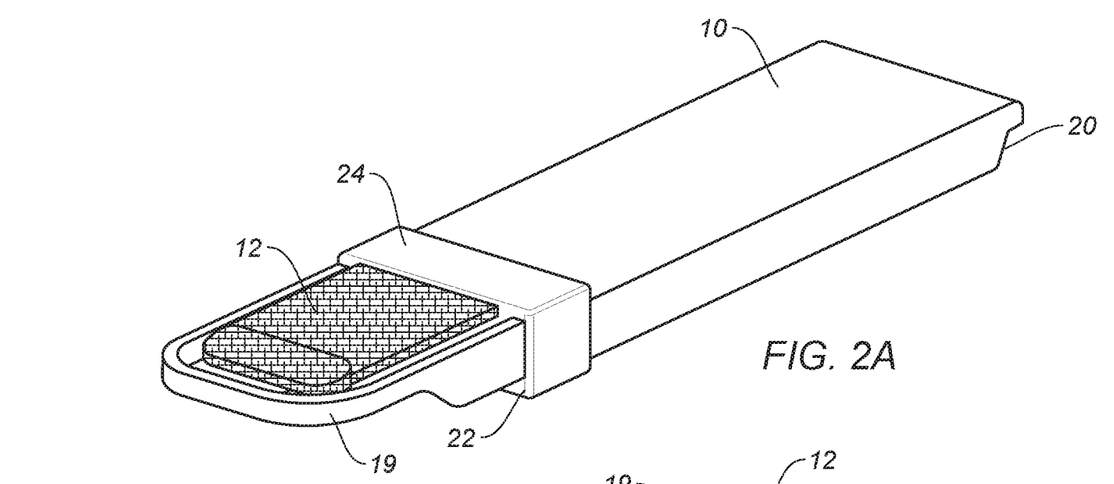
FIG. 2A is a perspective of the optical module of FIG. 1A.
Figure 2B:
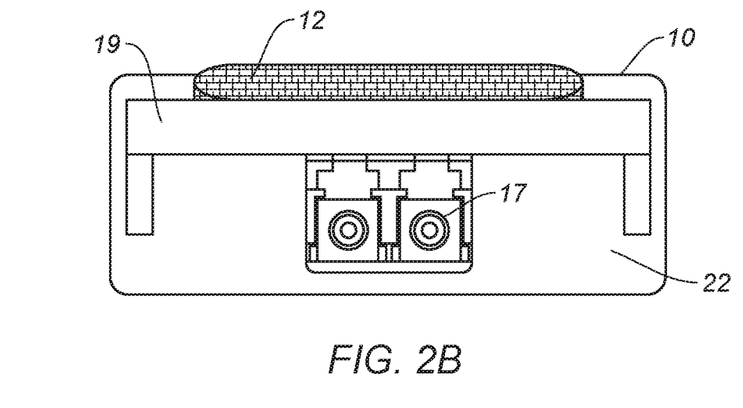
FIG. 2B is a front view of the optical module of FIG. 2A.

FIG. 2A is a perspective and FIG. 2B is a front view of the optical module 10 removed from the line card. The optical module 10 comprises a first end 20 for insertion into a network device (e.g., line card of a modular electronic system) and a second end 22 extending from the network device when the optical module is inserted into the network device (as shown in FIG. 1A). The first end 20 of the optical module 10 defines an electrical interface and the second end defines an optical interface between the optical module and one or more optical fibers. The first end 20 of the optical module 10 comprises an electrical connector (e.g., multiple contact edge type connector) for electrically coupling the optical module 10 to the network device (e.g., through optical module cage interface at the PCB 15) and the second end 22 of the optical module comprises one or more of the optical connectors 17 (e.g., MPO (Multi-fibre Push On) connector or LC duplex connector) (FIGS. 1A, 2A, and 2B). The optical module housing 24 may conform to industry standards packaging dimensions and may be formed from any suitable material.

As previously noted, the optical module 10 may include the pull-release handle (pull tab) 19, which may assist with insertion or removal of the optical module 10. As shown in FIG. 2A, the handle 19 may be generally U-shaped and extend outward from a front face (second end 22) of the optical module housing 24. The handle 19 may also be used to operate a latch mechanism to release the optical module 10. As shown in FIGS. 2A and 2B, the temperature indicator strip 12 may be positioned to extend outward from the second end 22 of the optical module 10 and at least partially above the handle 19 so that it is easily viewable from a front end of the optical module (FIG. 2B). The temperature indicator strip 12 is secured (coupled) to the optical module housing (case) 24 and therefore provides a close approximation as to the surface temperature of the optical module housing.

Figure 3:
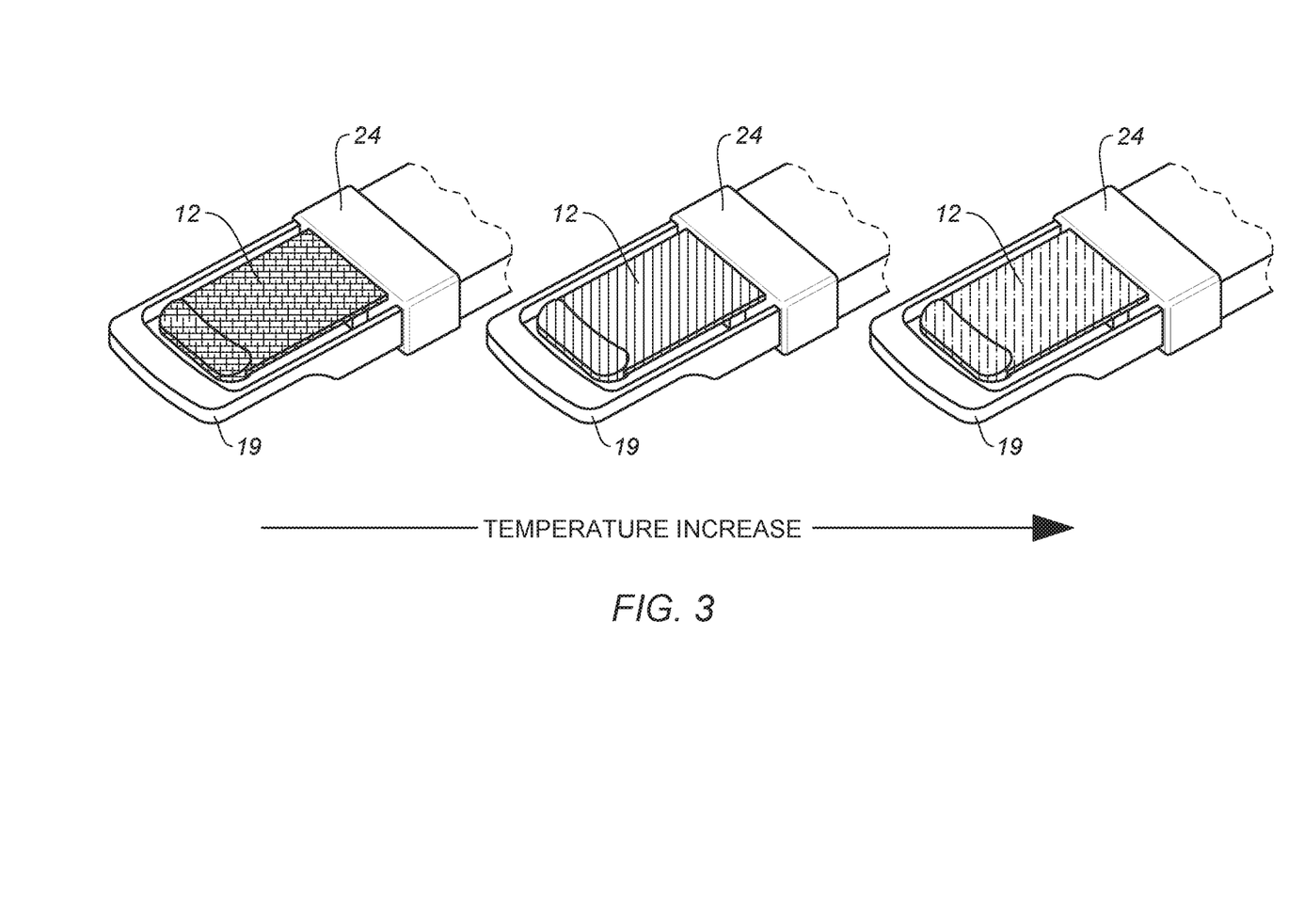
FIG. 3 illustrates changes in temperature of the optical module.

FIG. 3 illustrates color changes in the temperature indicator strip 12 as the optical module surface temperature increases (as viewed from left to right in FIG. 3). The temperature indicator strip 12 may comprise, for example, a rubber (or other flexible material) strip with one or more thermochromic pigments. The temperature indicator 12 is configured to change color when a temperature of the thermochromic pigment deviates from a predetermined or calibrated temperature threshold. The thermochromic pigments may be customized for different color schemes and activation temperatures, which are calibrated with the optical module surface temperature. The temperature indicator strip 12 is thermally coupled to the module surface to provide correlation with the optical module surface temperature.

In one embodiment, the thermochromic pigment is capable of undergoing a first thermochromic change from a first state (first color) to a second state (second color). For example, the temperature indicator strip 12 may be configured to change between a first color indicating that a surface temperature of the optical module is below a predefined safe touch temperature limit and a second color indicating that the surface temperature of the optical module exceeds the predefined safe touch temperature limit. In the example shown in FIG. 3, the temperature indicator 12 comprises more than one thermochromic pigment or compound, each sensitive to a different temperature limit so that the temperature indicator is capable of changing between at least three colors, each of the colors indicating a different temperature range. For example, a yellow color may indicate that the optical module surface temperature is below a first predefined temperature limit and is safe to touch. A pink color may indicate that the optical module surface temperature is above the first predefined limit but below a second predefined limit to indicate that the optical module is cooling but may still be too hot for safe touch. A purple color may indicate that the optical module surface temperature is above the second predefined limit and should not be touched. It is to be understood that any color schemes may be used and the colors and number of color changes used may be different than described herein.

It is to be understood that the shape and size of the temperature indicator strip 12 may be different than shown herein without departing from the scope of the embodiments. In one example, the strip 12 may generally correspond in size and shape to an opening defined by the handle 19 and vary according to the size of the optical module and handle. The temperature indicator strip 12 may be designed to correspond to different types of handle (pull tab) designs, without impacting the accessibility of the module front side port or requiring any design change to the handle.

Figures 4A, 4B:
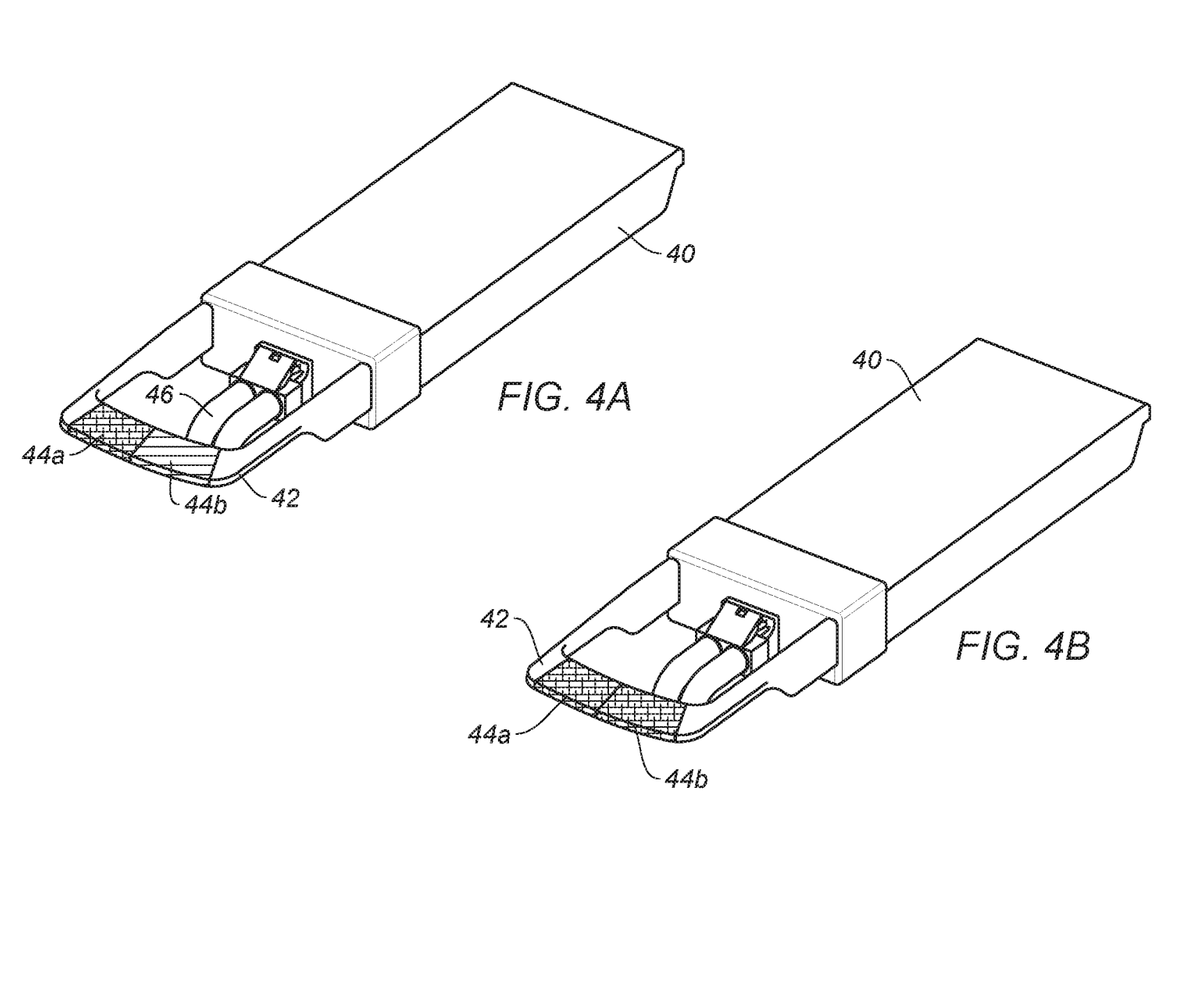
FIG. 4A is a perspective of an optical module with a temperature indicator handle indicating a safe touch temperature, in accordance with one embodiment.
FIG. 4B is a perspective of the optical module of FIG. 4A with the temperature indicator handle indicating a temperature exceeding a safe touch temperature limit.
Figure 5A:
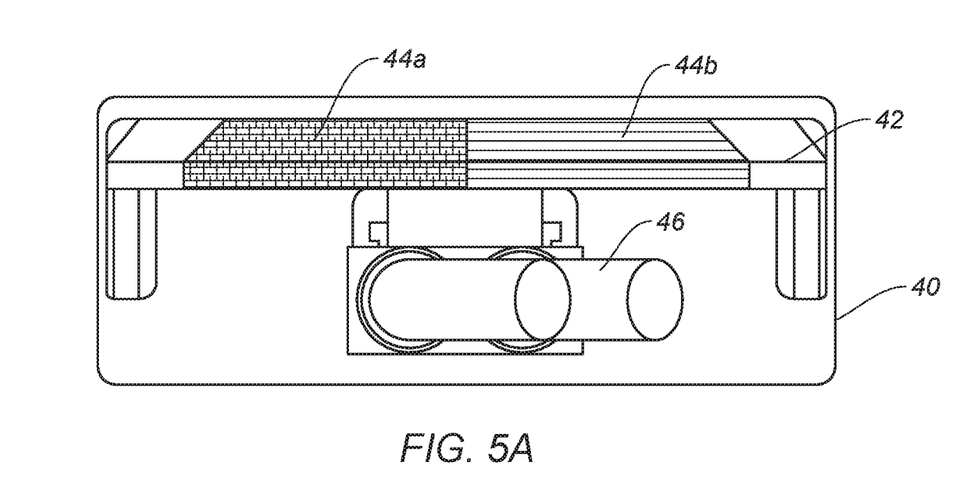
FIG. 5A is a front view of the optical module of FIG. 4A.
Figure 5B:
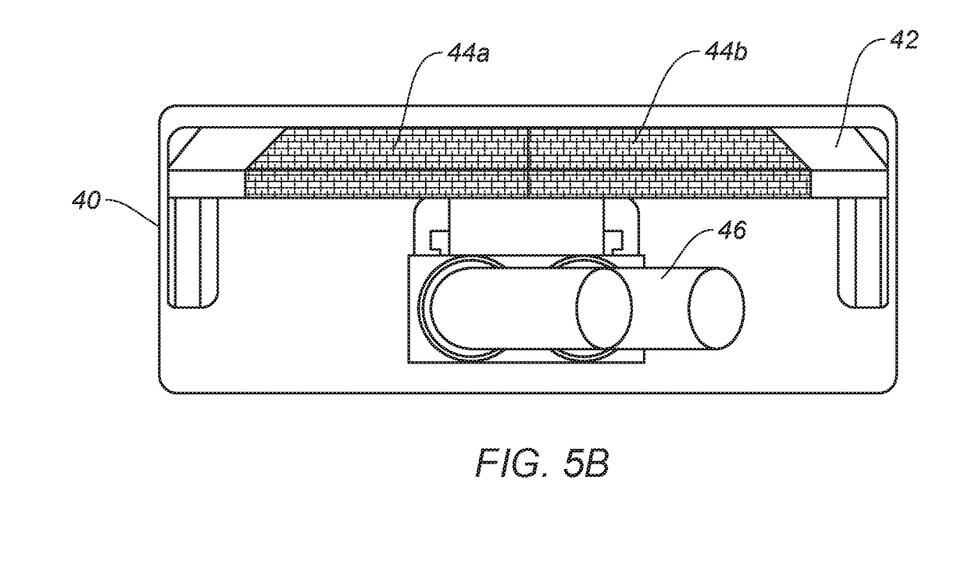
FIG. 5B is a front view of the optical module of FIG. 4B.

FIGS. 4A and 4B are perspectives and FIGS. 5A and 5B are front views illustrating another example of an optical module 40 with a temperature indicator (temperature indicator handle) 42, in accordance with one embodiment. As previously described, the handle 42 extends outward from the second end of the optical module and is positioned above cables 46. In one or more embodiments, a portion of the handle 42 is made with thermochromic pigments impregnated into a base thermoplastic resin material (or other suitable thermally conductive material) forming the handle (or a portion of the handle). In the example shown in FIGS. 4A-5B, a reference color is added to a first portion 44a of the handle 42 for comparison with a second portion 44b containing the temperature sensitive thermochromic material. The first portion 44a displays a reference color that remains unchanged and the second portion 44b displays a color that changes based on the surface temperature of the optical module 40. In one example, the second portion 44b may change from blue (cold) to yellow (hot). In one example, when the color on the two portions 44a, 44b of the temperature indicator handle 42 are different (FIGS. 4A and 5A), the optical module has cooled and is safe to remove. When the color on the two portions 44a, 44b matches (FIGS. 4B and 5B), the optical module 40 is hot and not safe to remove, thereby indicating that the user should wait until the second portion 44b changes to a different color than the first portion 44a. The change in color is easily viewable from a front end of the optical module extending from the network device as shown in FIGS. 5A and 5B. In one or more embodiments, the optical module 40 may include a tag (sticker, label) on the exposed end with a key identifying cold and hot color patterns of the temperature indicator handle 42.

Figure 6A:
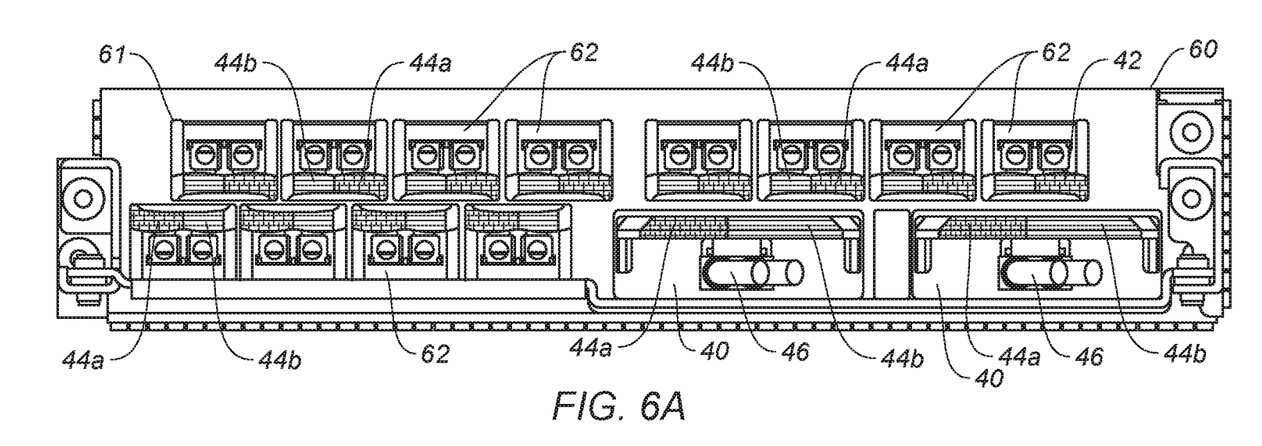
FIG. 6A is a front view of a line card with a plurality of optical modules installed with the temperature indicator handles indicating a safe touch temperature.
Figure 6B:
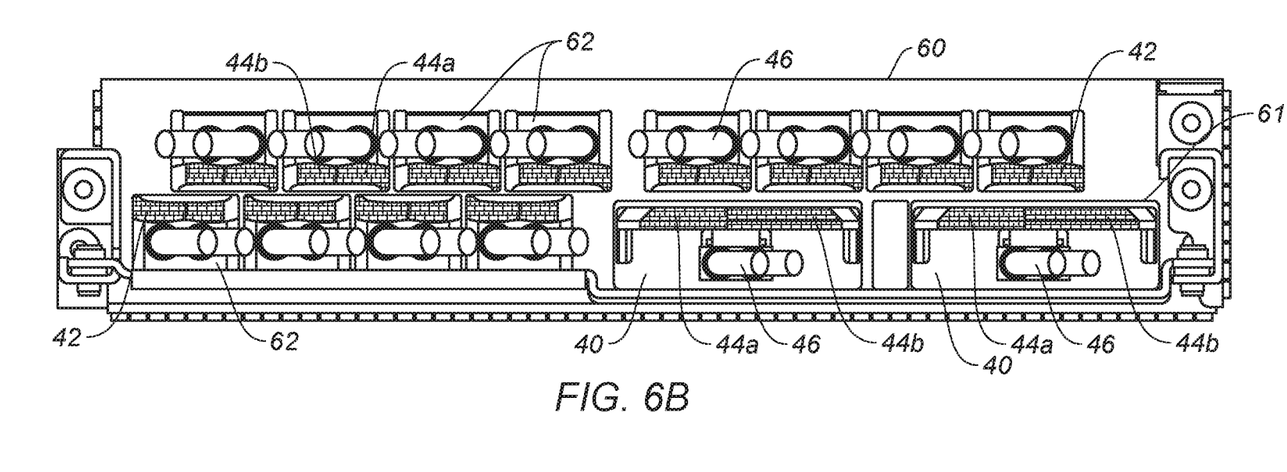
FIG. 6B is a front view of the line card and optical modules of FIG. 6A with the temperature indicator handles indicating a temperature exceeding the safe touch temperature limit.

FIGS. 6A and 6B illustrate an implementations on a line card 60 comprising a plurality of optical module ports 61 for receiving a plurality of optical modules 40 (e.g., CFP2 form factor) and 62 (e.g., QSFP form factor). FIG. 6A is a front view of the line card 60 and optical modules 40, 62 that have cooled and are safe to remove (colors on each portion 44a, 44b of the temperature indicator handle 42 are different). FIG. 6B is a front view of the line card 60 and optical modules 40, 62 when the optical modules are hot (exceed safe touch temperature limit) (colors on each portion 44a, 44b of the temperature indicator handle matches). As shown in FIGS. 6A and 6B the temperature indicator is always visible, even in high port density systems.

It is to be understood that the colors and use of a reference color, or whether the colors match when the optical module surface is hot, as described above is only an example and other colors or configurations may be used without departing from the scope of the embodiments. Also, the optical modules 40, 62 may cool at different rates based on a location within the network device, module type, or operating conditions. Thus, one or more of the optical modules 40, 62 shown in FIGS. 6A and 6B may be sufficiently cooled (safe to remove) while one or more of the optical modules are still hot (unsafe to remove).

In another example, a liquid crystal layer or label may be placed on the temperature indicator (strip 12, handle 42, or exposed metal surface of the optical module housing 24 as shown in FIG. 1A). The liquid crystal changes color in response to heat, thereby creating a visual indication of the temperature of the outer surface of the optical module. A label made of microencapsulated thermochromic liquid crystals (TLC) may be used to display module surface temperature. The crystals are sensitive to temperature and change their position/twist so as to affect the absorbed and reflected light. A backlit hot surface caution label may also be used (e.g., positioned on handle, temperature indicator strip, or exposed portion of housing). The caution symbol may be added on top of encapsulated TLC film to highlight the hot surface symbol only when the temperature exceeds the safe touch temperature limit. In this example, the hot surface symbol is illuminated only after the temperature exceeds a specified threshold value. The label is reversible and becomes dark when the module surface cools down.

The embodiments described herein may operate in the context of a data communications network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data over one or more networks. One or more of the network devices may comprise one or more optical modules with the temperature indicator described herein. The network device may include one or more processor, memory, and network interfaces, with one or more of these components located on a line card removably inserted into the network device. The network devices may communicate over or be in communication with one or more networks, which may include any number or arrangement of network communications devices (e.g., switches, access points, routers, or other devices) operable to route (switch, forward) data communications.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. An apparatus comprising:
   an optical module with a housing comprising a first end for insertion into a network device and a second end extending from the network device when the optical module is inserted into the network device;
   a handle coupled to the housing of the optical module at the second end; and
   a temperature indicator thermally coupled to the housing and extending beyond said second end of the housing toward the handle to improve correlation with an optical module surface temperature of the housing;
   wherein the temperature indicator provides an indication that the optical module surface temperature of the housing exceeds a predefined safe touch temperature limit.

2. The apparatus of claim 1 wherein the temperature indicator is configured to sense the optical module surface temperature through thermal conduction between the housing and the temperature indicator.

3. The apparatus of claim 1 wherein said indication comprises a change in color.

4. The apparatus of claim 1 wherein the temperature indicator comprises a thermochromic pigment configured to change from a first color to a second color at said predefined safe touch temperature limit and return to said first color when the optical module surface temperature falls below said predefined safe touch temperature limit.

5. The apparatus of claim 1 wherein the temperature indicator comprises a strip extending outward from said second end of the housing.

6. The apparatus of claim 5 wherein the strip is located within an opening defined by the handle.

7. The apparatus of claim 1 wherein a portion of the temperature indicator is located on the handle.

8. The apparatus of claim 1 wherein the temperature indicator comprises a first portion displaying a reference color that remains unchanged and a second portion displaying a color that changes based on the optical module surface temperature.

9. The apparatus of claim 1 wherein the temperature indicator is operable to change between at least three colors, each color indicating a different temperature range.

10. An apparatus comprising:
    a line card comprising a plurality of optical module ports; and
    a plurality of optical modules inserted into said plurality of optical module ports, wherein a particular optical module of the plurality of optical modules comprises a temperature indicator thermally coupled to an optical module housing of the particular optical module and extending beyond the optical module housing toward a handle of the particular optical module to improve correlation with an optical module surface temperature of the optical module housing;
    wherein the temperature indicator provides an indication that the optical module surface temperature exceeds a predefined safe touch temperature limit and is viewable with the particular optical module inserted into the line card.

11. The apparatus of claim 10 wherein the temperature indicator is sized to correspond to a size of the particular optical module.

12. The apparatus of claim 10 wherein said indication comprises a change in color.

13. The apparatus of claim 10 wherein the temperature indicator comprises a thermochromic pigment configured to change from a first color to a second color at said predefined safe touch temperature limit and return to said first color when the optical module surface temperature falls below said predefined safe touch temperature limit.

14. The apparatus of claim 10 wherein the temperature indicator comprises a strip extending outward from the optical module housing.

15. The apparatus of claim 10 wherein a portion of the temperature indicator is located on the handle of the particular optical module.

16. The apparatus of claim 10 wherein the temperature indicator comprises a first portion displaying a reference color that remains unchanged and a second portion displaying a color that changes based on the optical module surface temperature.

17. The apparatus of claim 10 wherein the temperature indicator is operable to change between at least three colors, each color indicating a different temperature range.

18. An apparatus comprising:
    an optical module comprising a first end for electrically coupling the optical module to a network device and a second end comprising an optical connector; and
    a temperature indicator strip thermally coupled to the optical module to improve correlation with an optical module surface temperature of the optical module and extending beyond said second end of the optical module toward a handle of the optical module;

wherein the temperature indicator strip is configured to change between a first color indicating that the optical module surface temperature is below a predefined safe touch temperature limit and a second color indicating that the optical module surface temperature exceeds said predefined safe touch temperature limit.

19. The apparatus of claim 18 wherein the temperature indicator strip comprises a flexible material with a thermochromic pigment.

20. The apparatus of claim 18 wherein the temperature indicator strip is configured to sense the optical module surface temperature through thermal conduction between an optical module housing and the temperature indicator strip.

* * * * *